(12) United States Patent
Gu et al.

(10) Patent No.: US 10,705,589 B2
(45) Date of Patent: Jul. 7, 2020

(54) SYSTEM AND METHOD FOR ASSOCIATIVE POWER AND CLOCK MANAGEMENT WITH INSTRUCTION GOVERNED OPERATION FOR POWER EFFICIENT COMPUTING

(71) Applicant: Northwestern University, Evanston, IL (US)

(72) Inventors: Jie Gu, Evanston, IL (US); Russ Joseph, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 317 days.

(21) Appl. No.: 15/604,098

(22) Filed: May 24, 2017

(65) Prior Publication Data
US 2017/0351318 A1    Dec. 7, 2017

Related U.S. Application Data

(60) Provisional application No. 62/344,561, filed on Jun. 2, 2016.

(51) Int. Cl.
*G06F 1/3234*    (2019.01)
*G06F 9/30*    (2018.01)
(Continued)

(52) U.S. Cl.
CPC .......... *G06F 1/3243* (2013.01); *G06F 1/324* (2013.01); *G06F 1/3296* (2013.01); *G06F 8/41* (2013.01); *G06F 9/30083* (2013.01); *G06F 9/30145* (2013.01); *G06F 9/30185* (2013.01); *G06F 9/3836* (2013.01); *G06F 1/08* (2013.01); *Y02D 10/126* (2018.01); *Y02D 10/152* (2018.01); *Y02D 10/172* (2018.01)

(58) Field of Classification Search
CPC ........................... G06F 1/3243; G06F 9/30083
See application file for complete search history.

(56) References Cited

U.S. PATENT DOCUMENTS

2009/0031155 A1\* 1/2009 Hofmann .............. G06F 1/3203
713/321
2009/0055678 A1\* 2/2009 Kummaraguntla ....... G06F 1/04
713/600

(Continued)

*Primary Examiner* — Kim Huynh
*Assistant Examiner* — Joshua Neveln
(74) *Attorney, Agent, or Firm* — Benesch, Friedlander, Coplan & Aronoff LLP

(57) ABSTRACT

A system includes an ARM core processor, a programmable regulator, a compiler, and a control unit, where the compiler uses a performance association outcome to generate a 2-bit regulator control values encoded into each individual instruction. The system can provide associative low power operation where instructions govern the operation of on-chip regulators or clock generator in real time. Based on explicit association between long delay instruction patterns and hardware performance, an instruction based power management scheme with energy models are formulated for deriving the energy efficiency of the associative operation. An integrated voltage regulator or clock generator is dynamically controlled based on instructions existing in the current pipeline stages leading to additional power saving. A compiler optimization strategy can further improve the energy efficiency.

19 Claims, 13 Drawing Sheets

(51) Int. Cl.
*G06F 9/38* (2018.01)
*G06F 8/41* (2018.01)
*G06F 1/324* (2019.01)
*G06F 1/3296* (2019.01)
*G06F 1/08* (2006.01)

(56) References Cited

U.S. PATENT DOCUMENTS

2009/0273361 A1* 11/2009 Batra .................... G11C 7/04
 326/16
2010/0318775 A1* 12/2010 Barry ................. G06F 9/30145
 712/234
2013/0019231 A1* 1/2013 Mangard ................ G06F 8/43
 717/151

* cited by examiner

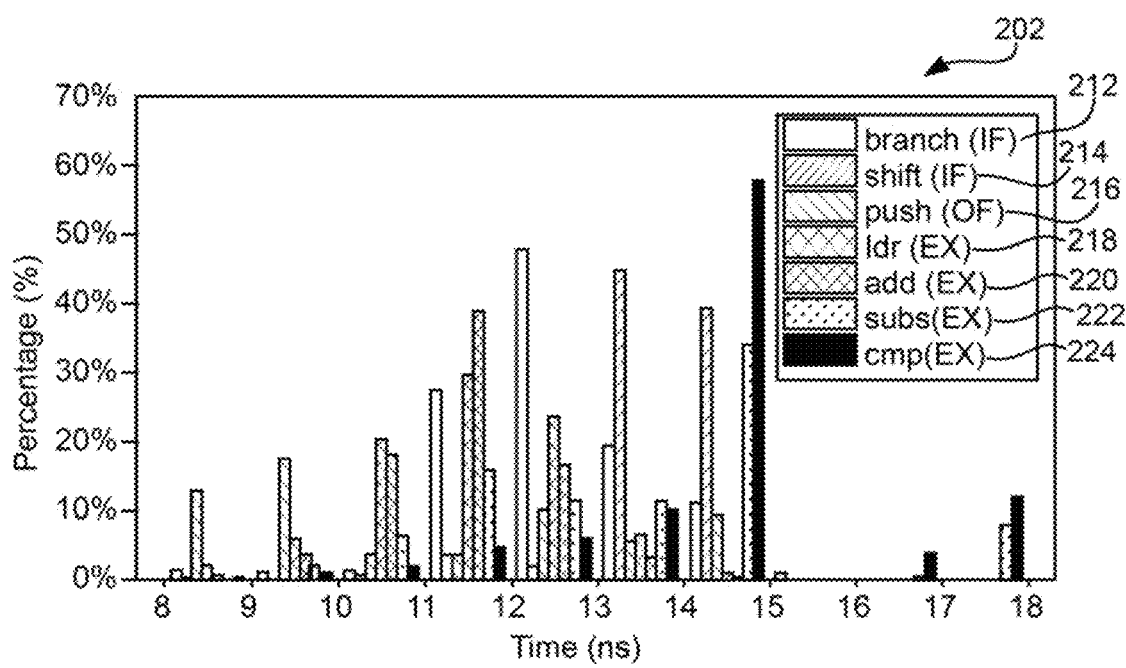
FIGURE 2B
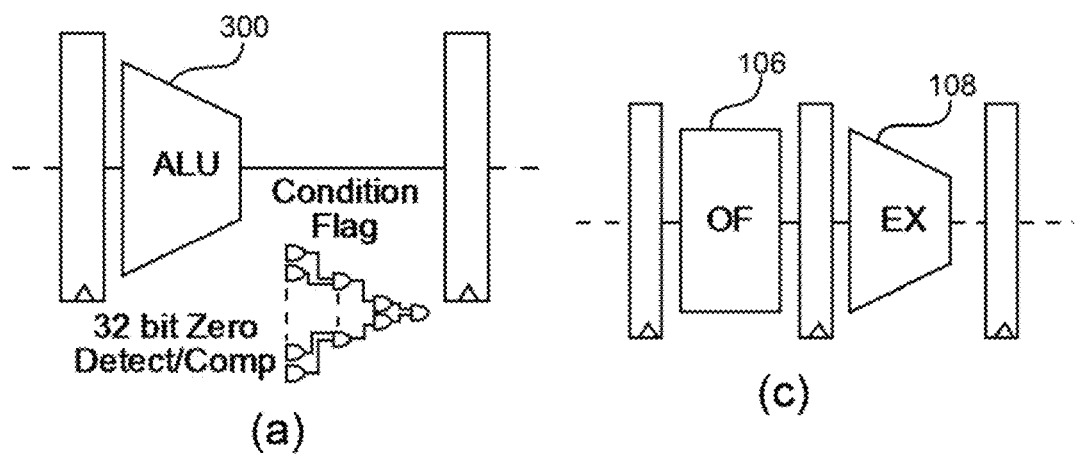
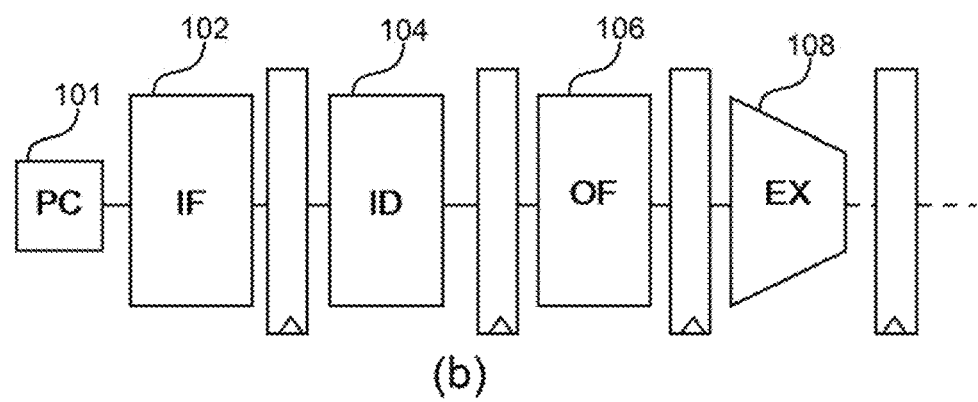
FIGURE 3A-C

SYSTEM AND METHOD FOR ASSOCIATIVE POWER AND CLOCK MANAGEMENT WITH INSTRUCTION GOVERNED OPERATION FOR POWER EFFICIENT COMPUTING

CROSS-REFERENCE TO RELATED APPLICATIONS

This patent application claims the benefit of U.S. Provisional Patent Application No. 62/344,561, filed on Jun. 2, 2016, the entire contents of which is incorporated by reference in its entirety.

STATEMENT OF FEDERALLY FUNDED RESEARCH OR SPONSORSHIP

This invention was made with government support under CCF1533656 and CCF1116610 awarded by the National Science Foundation. The government has certain rights in the invention.

BACKGROUND

At system level, dynamic voltage and frequency scaling (DFVS) has been utilized to explore an optimal tradeoff between performance and power. In traditional DFVS, highly efficient switching voltage regulators are deployed on the board shared among multiple chips in order to reduce the silicon costs of electronic components. The traditional switching regulator, buck regulator or switched capacitor regulators normally operate at a switching frequency of several hundreds of kHz to a few MHz limiting its response time to microseconds. As a result, previous DVFS scheme is only controlled at system level with coarsely defined power states and thus not capable of performing DVFS down at program level with fine granularity. In recent years, the new trend of integrating numerous on-chip regulators for multi-core processors provide flexibility for energy optimization. For example, 48 fast response (sub-ns) regulators with 2 regulators for each logic core and cache were deployed in the 12 cores of IBM Power 8 processor to achieve fast DVFS. Meanwhile, efficient on-chip switching regulator has been demonstrated with high configurability and fast response within 2-3 ns or even sub-ns. Such a fine grid on-chip voltage scaling capability introduces opportunities for low power electronic design. For example, a physical model and optimization methodology for on-chip switched capacitor regulator was developed to optimize the deployment of on-chip regulators for higher energy efficiency. An ultra-dynamic scheme was proposed to change supply voltage in a multi-Vdd configuration using different power switches, which allows the supply voltage to switch within a few nanoseconds leading to enhanced flexibility for DVFS. However, that scheme requires generation and routing of multiple supply voltages to the digital logic and generates large design overhead. While a majority of current energy optimization methodology for power management has remained at system level, a few previous works also explored architecture and circuit level co-optimization based on sophisticated insight into software programs. For example, a previous study shows that significant amount of resonant noise can be removed if the existence of critical instructions can be predicted in a pipeline leading to 10% performance improvement. A Razor based scheme was proposed to reduce timing error rate based on instruction type leading to 80% performance penalty reduction from timing error recovery in Razor technique.

BRIEF DESCRIPTION OF DRAWINGS

FIGS. 2A-B are graphs of critical instruction timing distributions for benchmark program stringsearch for (a) distribution at each pipeline stage; and (b) specific critical instruction distribution at specific stage.

FIGS. 3A-C are graphs of example hardware paths that cause long delay instructions including (a) path for EX stage, e.g. cmp (EX); (b) path for branch and stalled operation; (c) path related to the data dependency.

DESCRIPTION

Figure 1:
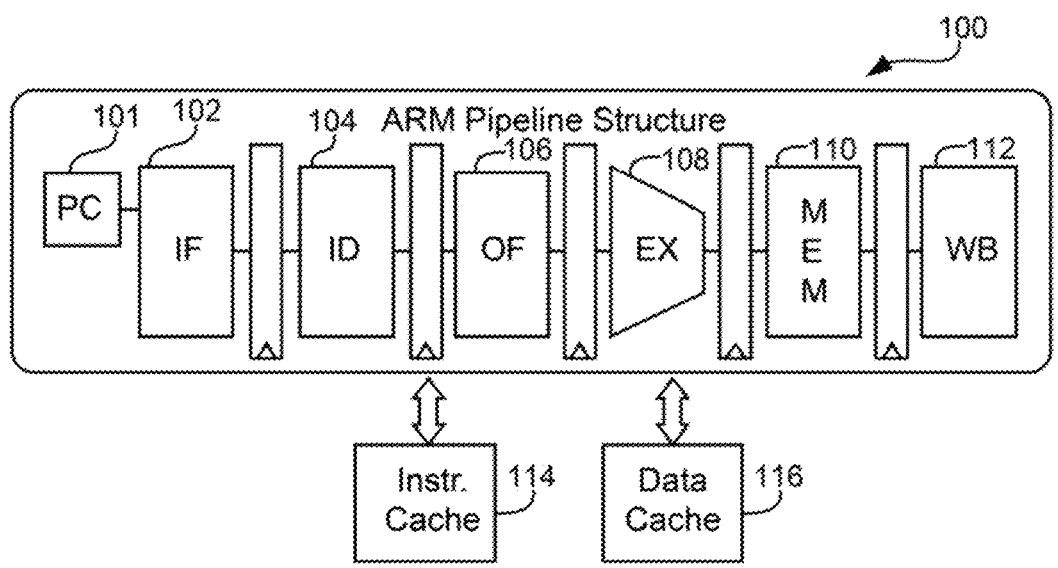
FIG. 1 is a block diagram of an example pipeline architecture.

The systems and methods can provide a low power operation where instructions govern the operation of on-chip regulators in real time. Based on explicit association between long delay instruction patterns and hardware performance, an instruction based power management scheme is described with energy models formulated for deriving the energy efficiency of the associative operation. The systems and methods can be demonstrated using a low power microprocessor design with an integrated switched capacitor regulator in, e.g., 45 nm CMOS technology. Examples on benchmark programs can show a power saving of around 14% from the described scheme. The values described herein are for explanation purposes and other values can be used. A compiler optimization strategy is also described to further improve the energy efficiency. Advantages can include one or more of energy efficient computing, integrated power management, low power design, switching regulator and compiler optimization, etc.

1. Introduction

The technology scaling of CMOS integrated circuits (IC) has slowed down in recent years as the conventional CMOS technology approaches its fundamental limit. As the benefits of technology scaling become more expensive to realize, an innovative systematic approach for low power design can solve the energy bottleneck of many emerging applications, such as wearable electronics, Internet-of-Things, biomedical devices. Because the power consumption of conventional Very Large Scale Integrated (VLSI) circuits are mainly determined by the operating voltages, supply voltage scaling has been used as a primary method for achieving low power operation. For example, to achieve ultra-low power consumption, tremendous efforts have been put into designing circuits operating at sub-threshold or near-threshold voltages where an optimum energy consumption can be achieved. Other advanced circuit techniques such as Razor techniques uses error detection mechanism to remove design margin for runtime variation achieving about a 10~30% power saving beyond conventional low power design techniques.

Instruction and Performance Association

The systems and methods can engage the control of on-chip regulator with the individual instructions inside software program for ultra-low voltage operation. Because a typical clock period of 10~100 ns at near-threshold operation exceeds the response speed of several nanoseconds from an on-chip switching regulators, an instruction driven voltage scaling scheme can be utilized to achieve extra energy saving unobtainable from existing low power techniques. The systems and methods can use an advanced reduced instruction set computer (RISC) machines (ARM) processor design to evaluate the design tradeoff and energy benefits for the described associative power management scheme. Advantages of the systems and methods are summarized below: (1) Based on large amount of instruction level timing analysis, a classification of critical instructions was developed to interpret the performance variation of software instructions; (2) An instruction governed power management scheme with supporting circuits was designed to take advantages of the significant amount of instruction level performance variations; (3) An energy model verified by transistor level simulation was derived to quantify the energy saving as well as overhead from the described scheme; (4) A compiler assisted program optimization method is also described to further improve the energy saving benefit.

Preliminary Performance Observation on Low Power Microprocessor

FIG. 1 is a block diagram of an example pipeline architecture 100. For example, an Advanced reduced instruction set computer (RISC) Machine (ARM) processor can be used in low power computing platforms. For explanation purposes, a single-issue ARMv5 processor is used in as a test vehicle for the described scheme due to its popularity in low power applications and its relative simple structure. Other processors can be used. The pipeline architecture 100 of the ARMv5 processor used in this paper is shown in FIG. 1, which has pipeline stages including a program counter (PC) 101, instruction fetch (IF) 102, instruction decode (ID) 104, operand fetch (OF) 106, execution (EX) 108, Memory (MEM) 110 and write back (WB) 112. Because the system and methods focus on energy improvement of the logic circuits, behavior instruction 114 and data caches 116 can be used for operation of the ARM processor. Following the Instruction Set Architecture (ISA) defined for ARMv5 architecture, the target pipeline architecture 100 can be designed and synthesized using commercial EDA design tools in a 45 nm CMOS technology. The pipeline architecture 100 can include a nominal supply of 1.1V, operating speed of 1 GHz and dynamic power consumption of 54 mW. The pipeline architecture 100 can be evaluated at ultra-low voltage condition of 0.5~0.55V using both spice level simulation and static timing analysis with timing library characterized at low voltages. For cycle-by-cycle performance evaluation, the timing can be checked with Synopsys VCS gate level simulation with instructions issued from the Gem5 architecture simulator. For software programs, programs in MiBench under every category of automotive, networking, consumer, office, security and telecommunication can be selected to evaluate the described scheme.

Figure 2A:
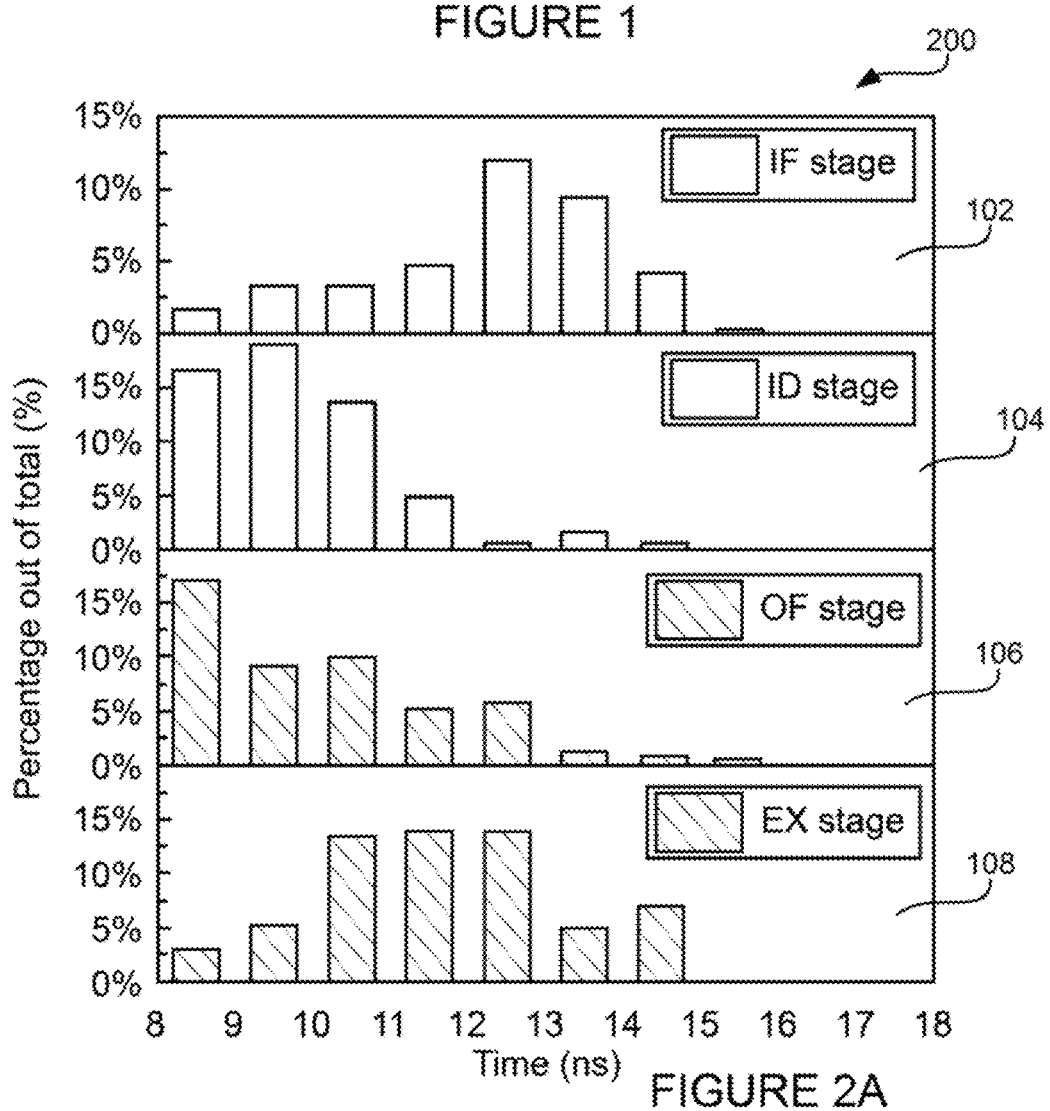

FIGS. 2A-B are graphs 200, 202 of critical instruction timing distributions for benchmark program stringsearch for (a) distribution at each pipeline stage; and (b) specific critical instruction distribution at specific stage. FIG. 2A illustrates the observation of the instruction timing distributions, e.g. circuit delay, at each pipeline stage in benchmark program "stringsearch" at 0.5V, e.g., IF stage 102, ID stage 104, OF stage 106 and EX stage 108. Although the design has been synthesized with the same critical path delay among pipeline stages, a more than 3× of delay variation for individual instructions is observed at every pipeline stage 102, 104, 106, 108. Similar wide spread of delay is also observed at nominal voltage of 1.1V leading to hypothesis that different instruction exercises different paths within the pipeline and shows considerably different performance. Other observations include: (1) the instruction delay occurred at EX stage 108 presents the longest delay in the pipeline mostly due to the complex operations in ALU; (2) only a very small number of instructions exercises the long critical paths. For example, the long delay instructions beyond 14 ns occupies only 7.3% of all valid instruction at EX stage 108, and only 4.5% at IF stages 102. Overall, 14.3% of total instructions experience delay beyond 14 ns although the critical path delay is at 18 ns which determines the minimum clock speed. MEM and WB stages in the design are not contributing long timing paths and thus are not included in the results.

The above observation can reveal a drawback of the conventional design strategy where only the worst-case delay is considered even though only 14.3% instruction exercise the critical paths. If the performance requirement of each instruction can be predicted and associated with the required supply voltages, significant energy saving can be achieved. This design includes about a 14 ns as a critical mask. For example, all instructions at every stage with delay beyond 14 ns is considered as "long delay instructions." Additional 10% timing margin can be applied to cover the other process-temperature-voltage variations similar to conventional design.

FIG. 2B shows the timing distributions of some common instructions at determined stages, e.g., branch (IF) 212, shift (IF) 214, push (OF) 216, ldr (EX) 218, add (EX) 220, subs (EX) 222 and cmp (EX) 224. Although there is significant delay variation, some specified instructions or instruction patterns are more likely to consume longer delay. For example, cmp (EX) 224 and subs (EX) 222 stages exercise the longest paths beyond 16 ns. The reason of this instruction timing variation may be primarily rooted in the architecture definition of the ARM processor and is explained in the following section.

Classification of Instructions

FIGS. 3A-C are graphs of example hardware paths that cause long delay instructions including (a) path for EX stage, e.g. cmp (EX); (b) path for branch and stalled operation; (c) path related to the data dependency. Data and circuit analysis can be performed for all long delay instructions and correlated the instruction behaviors with the gate level netlists in the synthesized design of the ARM core. The root causes of long delay instructions are summarized and classified into the following four main categories.

Category 1: Instruction from Long Execution in Single Stage

In the ARM processor, compare (cmp), subtraction set (subs), reverse subtraction set (rsbs) and multiplier (mul) are the most critical long delay instructions. An example of the long delay from cmp, subs, rsbs, is shown in FIG. 3A. An extra-long critical path inside EX stage is exercised from both arithmetic logic unit (ALU) 300 operation and computation of conditional flags at the 32-bit outputs of ALU 300. As a result, such instructions deterministically take longer time than regular ALU instructions such as add, sub, etc., even though their delay varies with the operand values during the operation.

Category 2: Instruction from Long Inter-Stage Operation

Majority of long delay instructions in this category is associated with branch instructions (beq, bne, blt, bgt, etc.). When the branch instructions reach the EX stage 108, it evaluates the conditional flags in EX stage 108. Depending on the evaluation result, it re-computes the program counter (PC) 101 and delivers new PC address, as shown in the critical path for branch in FIG. 3B. Such branch operations introduce delayed operations in the PC 101 resulting in late arrival of data at fetch stage. Long execution of branch is likely to happen if the branch is not taken because the PC 101 needs to be rerouted. However, as the branch outcome is difficult to be predicted, pessimistically classify all branch operation as long delay instructions.

Some special instructions determined in ARM instruction set architecture (ISA) use two or more clock cycles to complete such as instructions with shift lsl, lsr, instruction push and pop, or load/store instructions with special offset ldr r1, [pc] #, etc. For such instructions, the ARM processor splits it into several micro instructions after ID stage 104 and introduce a "stall" at IF stage to prevent the PC from incrementing. Such a stalled instruction has high probability of producing long delay instruction at IF stage 102 because it invokes critical paths from both ID stage 104 and IF stage 102, which is shown in FIG. 3B.

Category 3: Instruction with Data Dependency

Instructions using operands from the results of the prior instructions are also referred as instruction read-after-write (RAW). The data dependency can cause a long instruction at OF stage 106. FIG. 3C shows such an example when add at EX stage 108 writes the operation results into register r1, the following mov at OF stage 106 requests the r1 content immediately. When such a data dependency is observed, the ARM ISA issues forwarding operation from EX stage 108 to OF stage 106 leading to longer operation at OF stage 106, as the critical path shown in FIG. 3C.

Category 4: Instruction with Instruction Sequence Dependency

Small numbers of long delay instructions at IF stage 102 and OF stage 106 experiences dependency on the specific instruction sequence at ID stage 104 where decoded instructions trigger long operations such as PC 101 stall or operand forwarding. In some cases, even though such a condition, e.g. stall or forwarding is not eventually formed, a critical path may still be exercised due to switching of temporary logic states inside the pipeline 100. Such special critical paths are only executed from a combination of instruction sequences. This category of long delay instructions is not well defined in ISA but is highly related to the way the synthesis tools optimize the design and thus is highly design dependent. Fortunately, only small and highly predictive numbers of instruction sequences are observed in the analysis. For a specific CPU design, this category of instructions can be carefully scrutinized based on the processor physical design rather than the architecture of the CPU.

Instruction Performance Association and Prediction Efficiency

Based on the classification of each long delay instruction category and extensive gate level simulation of long delay instructions, identify 100% long delay instructions with pessimism, e.g. potential long instruction is always marked as "long instruction". Table 1 lists summary of benchmark "stringsearch" with most representative instruction sets and their prediction accuracy, which is determined as the number of real long delay instructions over the total pessimistically predicted long delay instructions. It is observed that the prediction accuracy for branch instructions in Category 2 and Category 3 is low due to the delay dependency of operand values or branch conditions. Meanwhile, for the Category 1, 4, and majority of stall instructions in Category 2, the prediction accuracy can be higher than 45%. Overall, the total long delay instructions is 14.29% out of all valid instruction in program "stringsearch". The described instruction categories can cover all of these long delay instructions with the prediction accuracy 46.51%. In other words, pessimistically mark all critical long instructions with ~100% overhead.

TABLE 1

Critical instruction sets with their prediction accuracy in stringsearch.

| Instruction/Pattern | Stage | Category | Percentage out of total | Prediction Accuracy |
|---|---|---|---|---|
| cmp/subs/rsbs/mul | EX | 1 | 7.19% | 46.28% |
| Branch | IF | 2 | 0.71% | 23.15% |
| Stall instr. | IF | 2 | 1.94% | 52.51% |
| Push/Pop | IF | 2 | 1.66% | 69.57% |
| Data dependency | OF | 3 | 1.03% | 40.58% |
| Instruction Sequence | IF | 4 | 0.93% | 55.39% |
| Overall | All stage/category | | 14.29% | 46.51% |

Instruction Associative Power Management

Overall System Design

Figure 4:
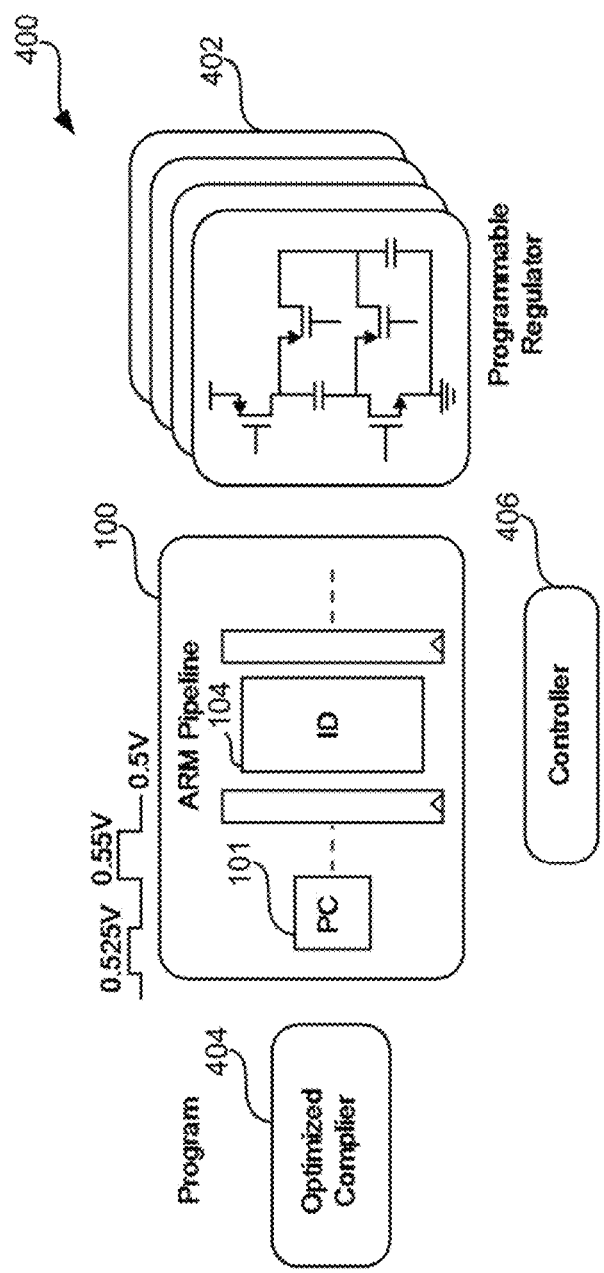
FIG. 4 is a block diagram of an example system design.

FIG. 4 is a block diagram of an example system design 400. In FIG. 4, which includes one or more of ARM core processor (pipeline) 100, programmable regulator 402, optimized compiler 404 and control units 406. Different from conventional compiler operation, the compiler in the described scheme uses the performance association outcome to generate a 2-bit regulator control values encoded into each individual instruction. After the instruction arrives at ID stage 104, the 2-bit regulator control is decoded and sent to the voltage controller 406, which issues the regulator 402 to raise supply by either 25 mV or 50 mV. This 2-bit voltage control encoded in the current instruction set presents a forward-looking voltage setting for the instructions two cycles after and only trigger action of regulator one clock cycle after it is decoded.

To encode the per instruction voltage level controls, a new operating mode to the ARMv5 instruction set is added, which takes advantage of underutilized ARM condition codes by remapping them to encode the low voltage mode operations. The instruction stream hence contains all of the voltage control information without requiring additional memory footprint or drastic modification to the rest of the ISA. In rare cases when the additional condition codes are actually needed, the compiler 404 may insert a mode switch into the instruction stream as is available in later revisions of the ARM ISA to enable/disable execution of Thumb instructions. This allows to achieve the benefits of voltage control with negligible impact on overall hardware cost. This can be similar to benign binary modification techniques which have been used to encode information directly into the instruction stream.

3.2 Integrated Switched Capacitor Regulator

Figure 5:
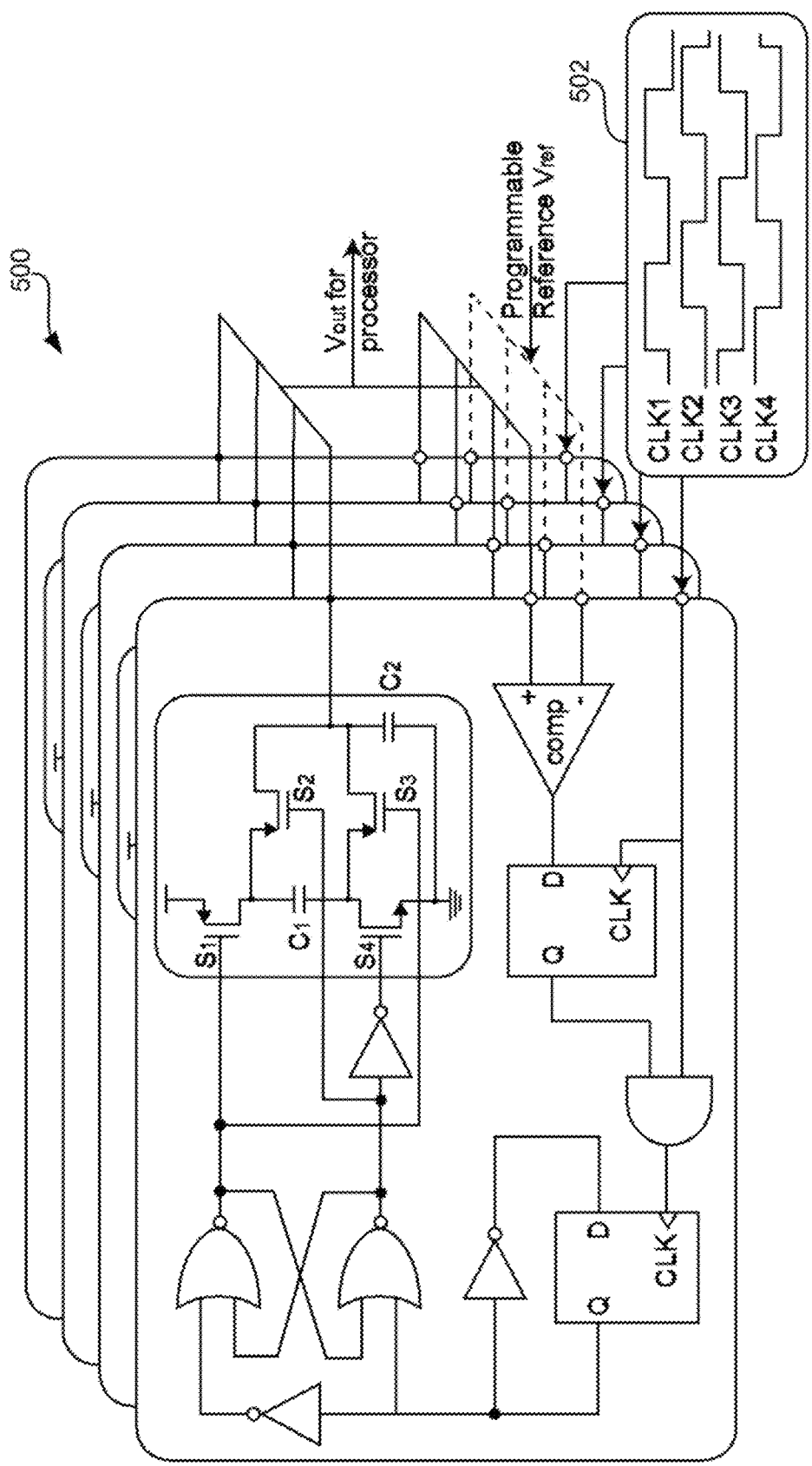
FIG. 5 is a circuit diagram of an example implementation of the 4-phase 2-to-1 switched capacitor power regulator.

FIG. 5 is a circuit diagram of an example implementation of the 4-phase 2-to-1 switched capacitor power regulator 402. FIG. 5 shows the schematic 500 of the 4-phase time interleaved switched capacitor (SWCAP) regulators. The regulator 402 is designed at transistor level in Cadence Virtuoso in 45 nm technology and consists of a multi-phase clock generator 502, four 2-to-1 SWCAP cores and programmable references generators with 25 mV resolution. The regulator 402 which supplies power for the ARM core runs from 1.2V supply voltage and can generate output voltages from 0.45V to 0.575V with 25 mV resolution with a 200 MHz clock. The regulation of output voltage was provided from the activation of switching activity of each SWCAP core based on the voltage comparator output results. The capacitors (~200 pF) and switch sizes used in the regulator 402 can be optimized to support a maximum of 2.3 mA current to the ARM core with nominal usage of 1.65 mA current at 0.55V.

Figure 6:
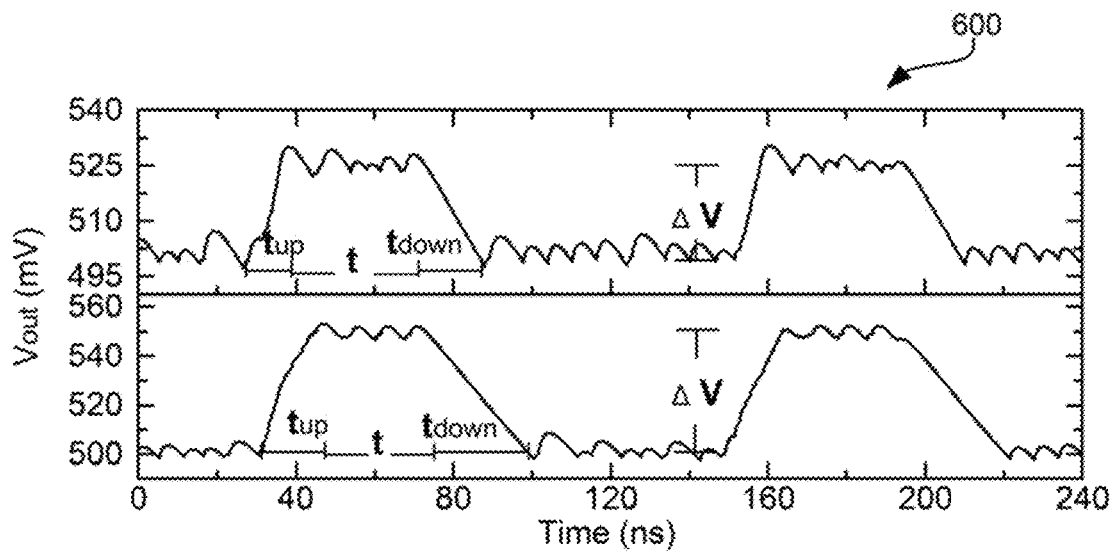
FIG. 6 is a graph of an example simulated waveforms of output voltage transition between 0.5-0.525V (ΔV=25 mV) and 0.5-0.55V (ΔV=50 mV).

FIG. 6 is a graph 600 of an example simulated waveforms of output voltage transition between 0.5-0.525V ($\Delta V$=25 mV) and 0.5-0.55V ($\Delta V$=50 mV). The simulated regulator output waveforms driving ARM core using transistor level schematic with voltage level ramping up and down between 0.5V and 0.55V. Under the current regulator configuration and loading with ARM core, it takes approximate half clock cycle (tup,25 mV=7 ns) to raise the supply by 25 mV and one clock cycle (tdown,25 mV=14 ns) to drop the supply back by 25 mV. The supply rise of 50 mV requires around twice of the time for 25 mV. Such a lead time requires action to be taken at least a clock earlier before long delay instruction reaches its critical pipeline stages. The energy delivery efficiency is also simulated for each output voltage level in the described regulator 402, as listed in Table 2. Although the efficiency generally improves with higher voltage due to less voltage drops across capacitors, when output at 0.55V, the switching loss happens more frequently and dominates the total power loss causing the regulator efficiency to drop.

TABLE 2

Regulator efficiency for each voltage level.

| | Vout | | |
|---|---|---|---|
| | 0.5 V | 0.525 V | 0.55 V |
| Efficiency ($\eta$) | 71.81% | 72.52% | 69.65% |

Energy Model of Described Associative Operation

For conventional switched capacitor (SC) regulator circuits, there are several energy delivery loss portion contributing to the total energy loss, including switch conduction loss $E_{Rsw}$, fly capacitors charging and discharging loss $E_{Cfly}$, parasitic loss from bottom capacitance $E_{C,bott}$, and the switch gate capacitance loss $E_{C,gate}$, which can be expressed by following equations for one switch activity:

$$E_{loss} = E_{Rsw} + E_{Cfly} + E_{C,bott} + E_{C,gate} \quad (1)$$

these corresponding terms can be derived as following for the described SC regulator:

$$E_{Rsw} = P_o \frac{R_{sw}}{4R_L f_{sw}}, \; E_{Cfly} = \left(1 + \frac{1}{k_{int}}\right) \frac{I_L^2}{8 f_{sw} C_{fly} f_{sw}} \quad (2)$$

$$E_{C,bott} = C_{bott} V_o^2, \; E_{C,gate} = C_{sw,gate} V_{sw}^2 \quad (3)$$

where $R_{sw}$ and $f_{sw}$ correspond to the switch resistance and switching frequency, and $P_o$ and $k_{int}$ stand for the output power and clock interleaving number.

In order to quantify the regulator output voltage transition loss, the regulator switching activities during the voltage transition time $t_{up}$ and $t_{down}$ are analyzed. At different output voltage level, the regulator ripple magnitude can be addressed by:

$$\Delta V_{ripple} = \frac{(V_{dd} - 2V_o)C_1 - I_L t'_{up}}{k_{int}(C_1 + C_2) + C_{load}} \approx \frac{(V_{dd} - 2V_o)C_1}{k_{int}(C_1 + C_2) + C_{load}} \quad (4)$$

in which term $I_L t'_{up}$ stands for the charge delivered from load within short charging time after each switching. The equation also shows ripple magnitude becomes smaller at higher output voltage level. In order to achieve voltage transition $\Delta V$, define $n_{sw}$ is the regulator switching times during voltage rising time $t_{up}$, which normally can be estimated as the integer of transition voltage $\Delta V$ over the average regulator steps $\Delta V_{ripple}$. After that, the regulator voltage transition time $t_{up}$ and $t_{down}$ are expressed as:

$$t_{up} = \frac{n_{sw}}{k_{int} f_{clk}} \quad (5)$$

$$t_{down} = k_{int}^2 \cdot \frac{\Delta V C_{fly} R_L}{V_o + \Delta V / 2} \quad (6)$$

During each voltage transition activity, the extra energy loss in comparison with regular $V_o$=0.5V operation can be derived as:

$$\Delta E_{loss,trans} = [n_{sw} - (t_{up} + t_{down}) f_{sw,v_o}] E_{loss} + \left[\frac{(V_o + \Delta V / 2)^2}{\eta_{v_o + \Delta v/2}} - \frac{v_o^2}{\eta_{v_o}}\right] \frac{(t_{up} + t_{down})}{R_L} \quad (7)$$

Equation (7) shows the extra energy loss during the voltage transition comes from both more frequently switching loss and the extra energy consuming at higher output voltage (0.5+$\Delta V$)V, in which the second part dominant more out of the total transition loss.

Based on the ARM instruction observation before, dynamic power strategy is assigned, as listed in Table 3. As long execution instructions at EX stage108 (category 1) mostly take longer than 16 ns, higher voltage level 0.55V need to be utilized based on spice level simulation. For the other categories of long delay instructions which take 14~16 ns, voltage level 0.525V is applied. The rest instructions with less than 14 ns will use low voltage 0.5V to save power.

Thus the dynamic 0.5V low energy saving benefit can be obtained comparing with regular 0.55V operation, as (8):

$$E_{save(\%)} = 1 - \frac{V_{0.5}^2 \times p_{0.5}/\eta_{0.5} + V_{0.525}^2 \times p_{0.525}/\eta_{0.525} + V_{0.55}^2 \times p_{0.55}/\eta_{0.55}}{V_{0.55}^2/\eta_{0.55}} \quad (8)$$

in which p is the percentage of operation at each voltage level and η is power efficiency at that voltage level. In addition, when the dynamic voltage transition loss $\Delta E_{loss,trans}$ is taken into account, the actual power saving will be updated as:

$$E_{save,lossy(\%)} = E_{save(\%)} - \frac{\Delta E_{loss,trans} \times p_{trans}}{(t_{up} + t_{down})f_{sw,v_o}E_{in,v_o}} \quad (9)$$

in which $p_{trans}$ is the percentage of time a voltage transition of 25/50 mV happens, and $V_o$ is set to be the low voltage baseline 0.5V. The described voltage levels are for explanation purposes and other voltages can be used.

TABLE 3

Dynamic power assignment strategy for different long delay instruction categories in stringsearch.

| | Voltage level | | |
|---|---|---|---|
| | 0.55 V | 0.525 V | 0.5 V |
| instr. category | Category 1 | Category 2/3/4 | rest instr. |
| instr. time | 16~18 ns | 14~15 ns | <14 ns |
| Percentage (p) | 15.63% | 15.09% | 69.28% |

Complier Optimization for Associative Power Management

In conventional design strategy, the instruction is bounded by the worst critical path delay on the chip and thus most instructions are treated equally in term of performance and energy from compiler point of view. The systems and methods introduce a compiler 404 optimization scheme that long delay instruction can be replaced by shorter ones to save energy consumption.

In ARMv5 ISA, the checking of "equal to" relationship can be implemented using either cmp or teq instructions. They are equivalent semantically, while implementation-wised are quite different. teq sets the zero status register if two operands being equal, which is commonly implemented using XORs, while cmp checks the relationship of greater, equal or smaller between two values generally requires subtraction using adders. As a result, teq can be operated much faster than cmp as no subtraction is involved. Given such timing characteristics, the compiler replace teq with cmp whenever it is possible without changing semantic of program.

Example Results

Figure 7:
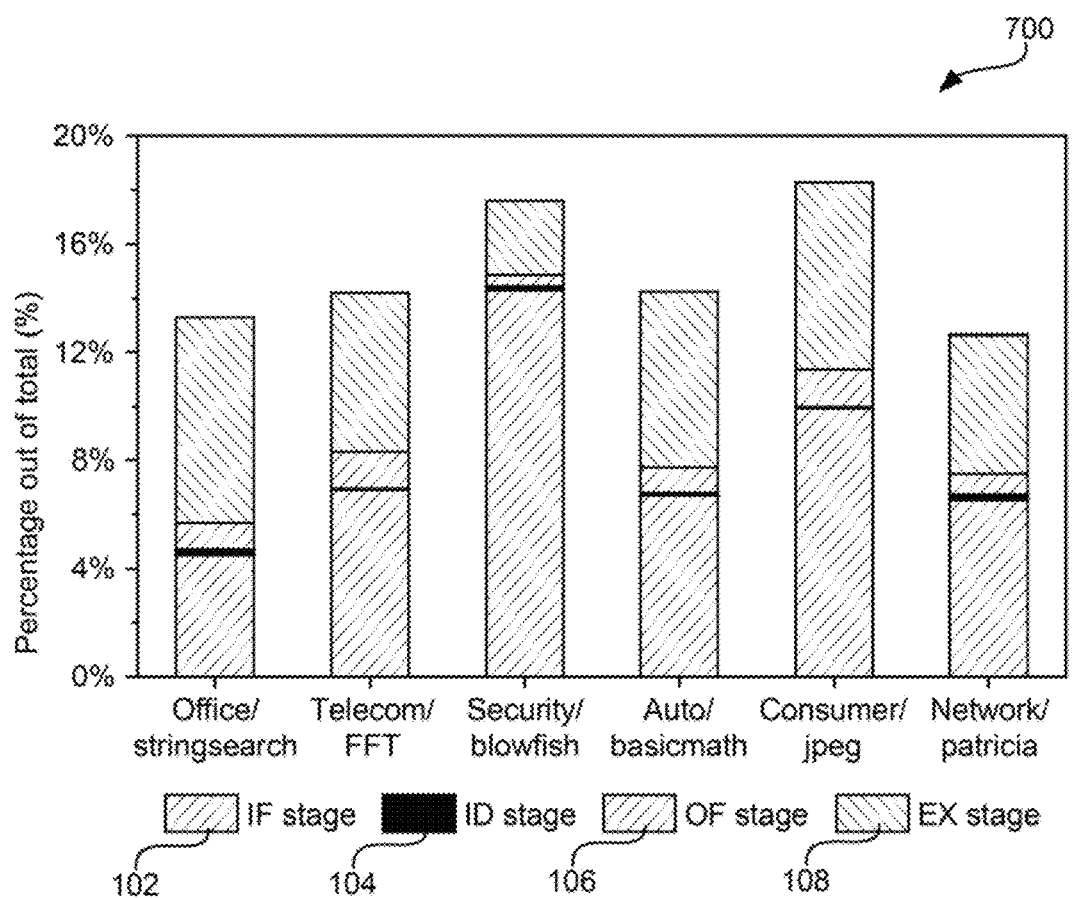
FIG. 7 is a graph of an example long instruction distributions at each stage.
Figure 8A:
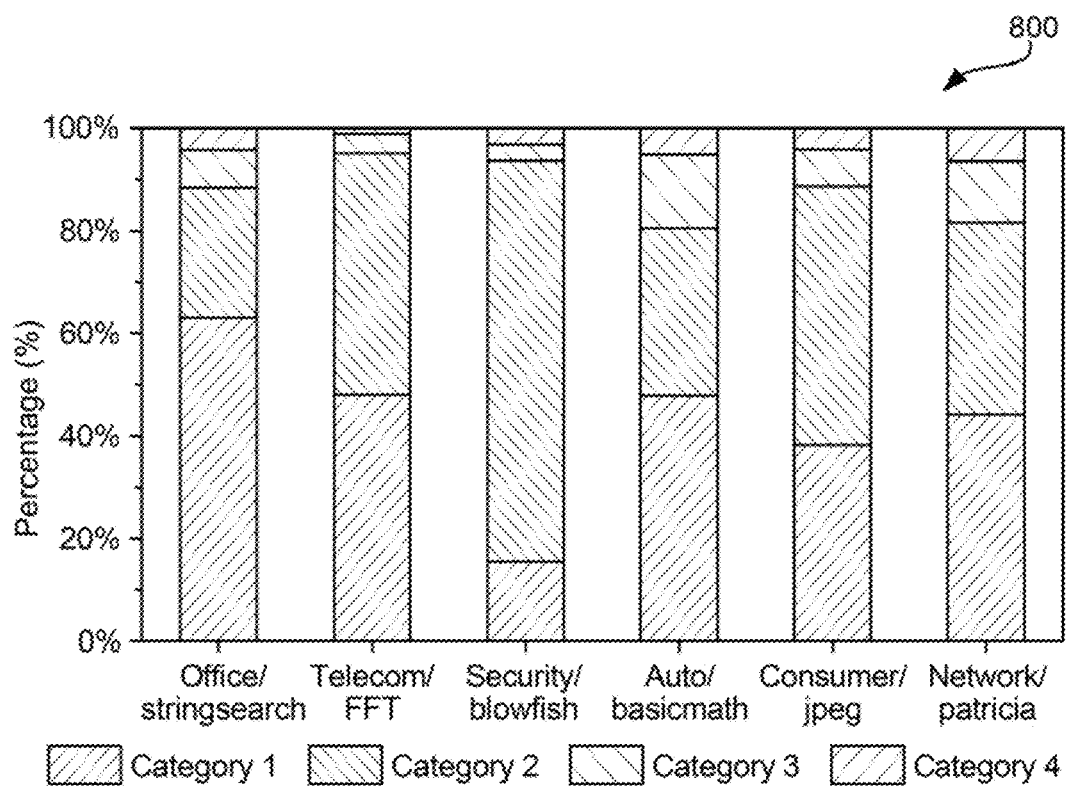
FIGS. 8A-B are graphs of example long delay instruction category distributions (a) and their prediction accuracy (b).
Figure 8B:
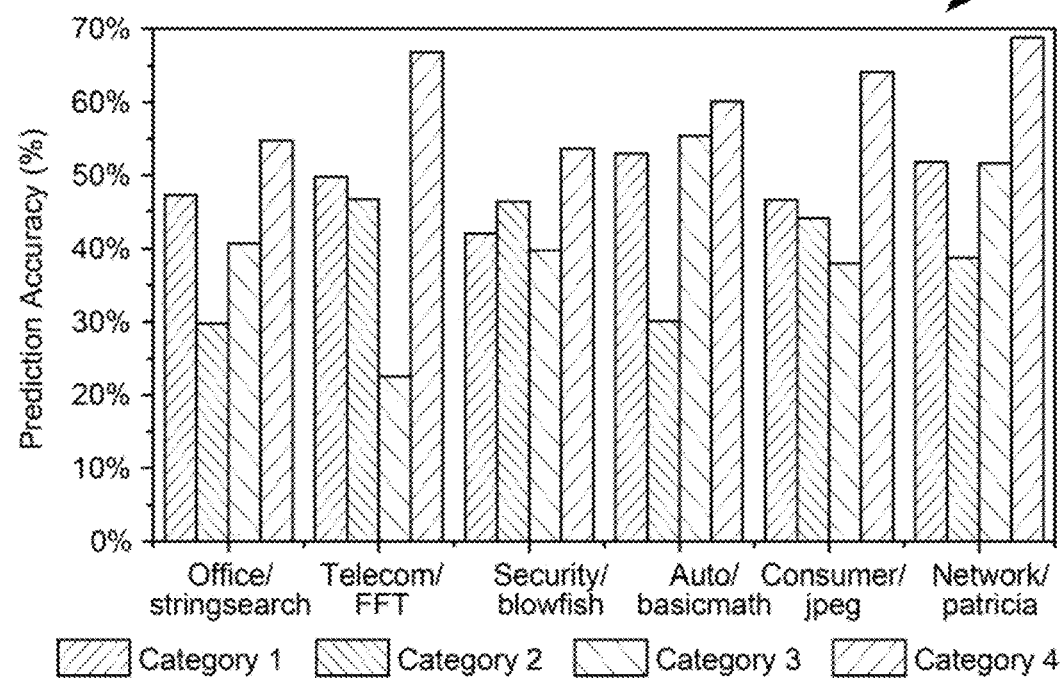
Figure 9:
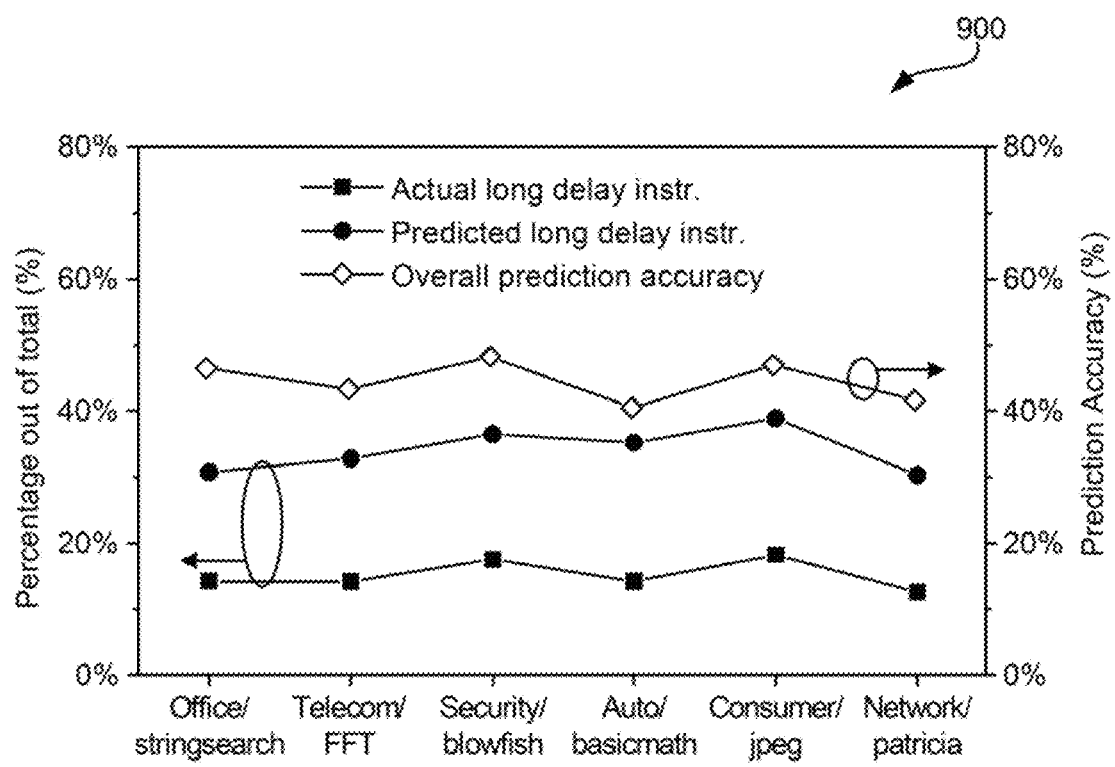
FIG. 9 is a graph of an example overall instruction pattern prediction accuracy for each benchmark.

FIG. 7 is a graph 700 of an example long instruction distributions. Six benchmark programs under each Mibench category are simulated at gate level to verify the described system scheme for 30,000 cycles. In FIG. 7, the long delay instruction distribution at each pipeline stage 102, 104, 106, 108 for these programs. The long delay instructions vary within 13~18% out of total for different programs, with majority occur at IF stage 102 or EX stage 108. The long delay instructions happen varies in 5~15% at IF stage and 3~8% at EX stage 108. The long delay instructions at OF stage 106 and ID stage 104 are only less than 2%. All 100% long delay instructions are pessimistically identified in these benchmarks. The instruction category distribution 800 are shown in FIG. 8A, with their prediction accuracy 802 for each category given in FIG. 8B. The accuracy of branch (category 2) and data dependence (category 3) is mostly lower than 40% as it highly depends on the instruction content or operand. The other two instruction prediction categories can achieve better prediction accuracy between 40~60%, or even higher in some benchmark. The overall long delay instruction prediction accuracy 900 for each benchmark is summarized in FIG. 9. The instructions beyond 14 ns are around 12~19% out of total instructions, and the overall instruction prediction accuracy is above 40% for all benchmarks.

Figure 10:
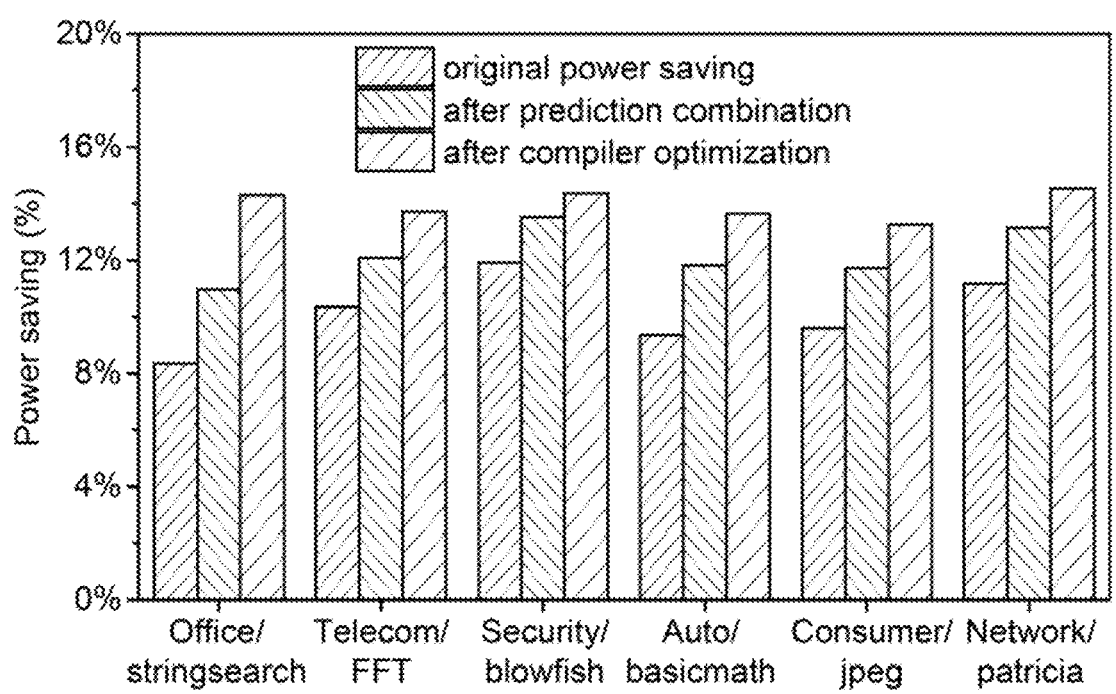
FIG. 10 is a graph of an example overall power benefit from the described scheme and the improvement from the compiler optimization.
Figure 11:
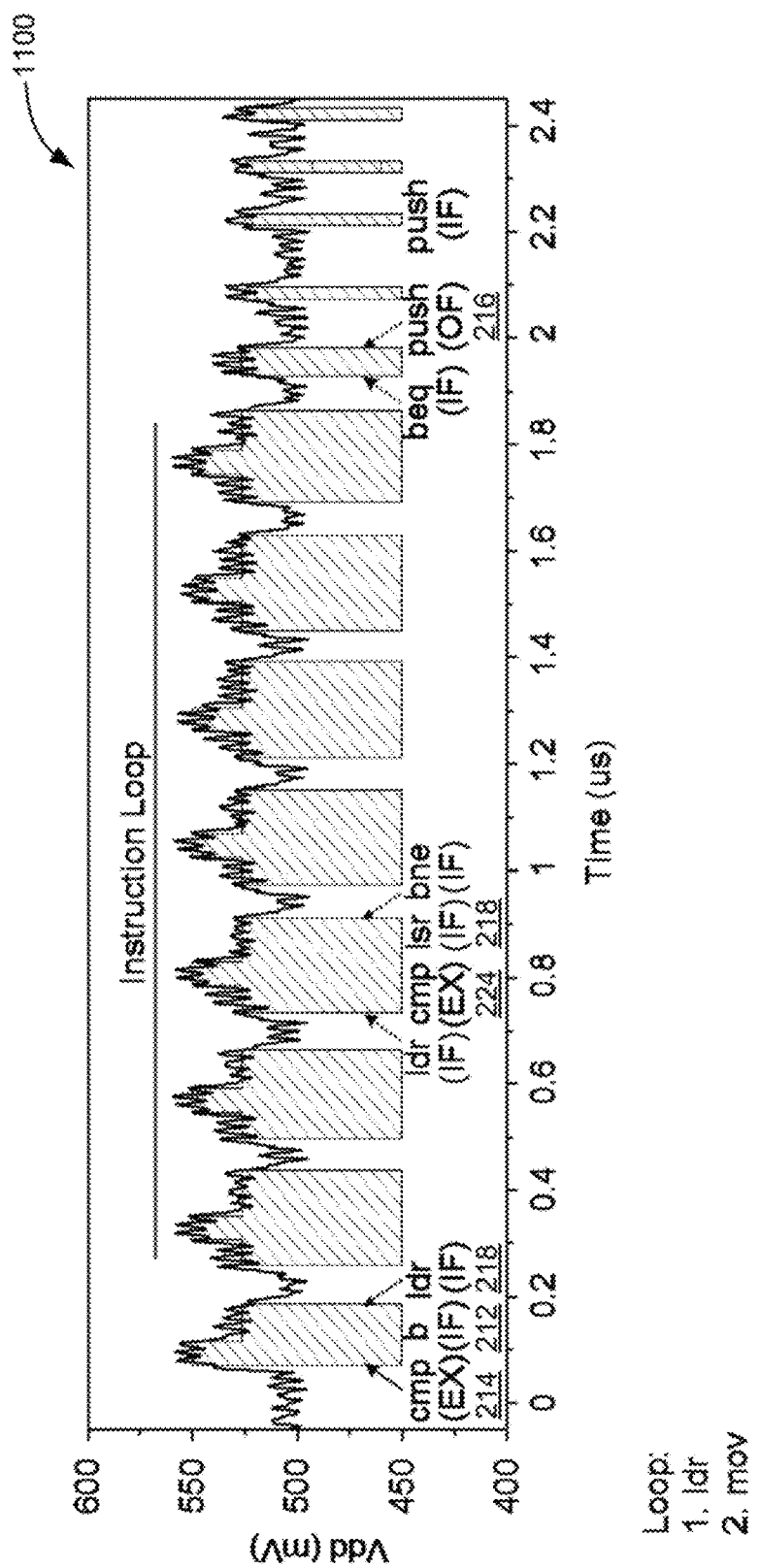
FIG. 11 is a graph of an example spice level power management simulation, with loop instructions and coherent prediction cases.

Based on these instruction prediction, the described dynamic power management scheme is implemented on each benchmarks. The power saving benefit is obtained by comparing the described dynamic power strategy with regular 0.55V operation, as the original power saving 1000 in FIG. 10. Another interesting observation is many instructions are concurrently predicted. As example graph 1100 in FIG. 11 illustrates, instructions bne, cmp, ldr, lsr are sequentially predicted as "long delay instructions", and ldr is concurrently predicted for both IF stage 102 and OF stage 106. This kind of sequential and concurrent prediction behavior saves voltage transition loss and reduce total predicted instruction number, which contributes around 2% more power saving. Besides, with current optimized compiler replacing 3~9% long delay instructions (cmp) with shorter instruction (teq), another 1.5~2.8% power saving is gained. Overall, around 14% power saving is achieved from the described scheme. The described system is simulated in the Cadence Virtuoso AMS mixed-signal environment with full transistor level schematic of ARM pipeline and regulator. The prediction and dynamic adjustment can be realized by a voltage controller 404 controlling the regulator 402 references. In order to avoid process variation and noise effects, 10% clock margin is added as the conventional clock strategy. As shown in FIG. 11, the ARM core power Vdd has been successfully adjusted based on the critical instructions in the pipeline stages. Loop instruction cases are also observed which request repeatable voltage changing.

Fast Clock Management for High Performance Operation

Figure 12:
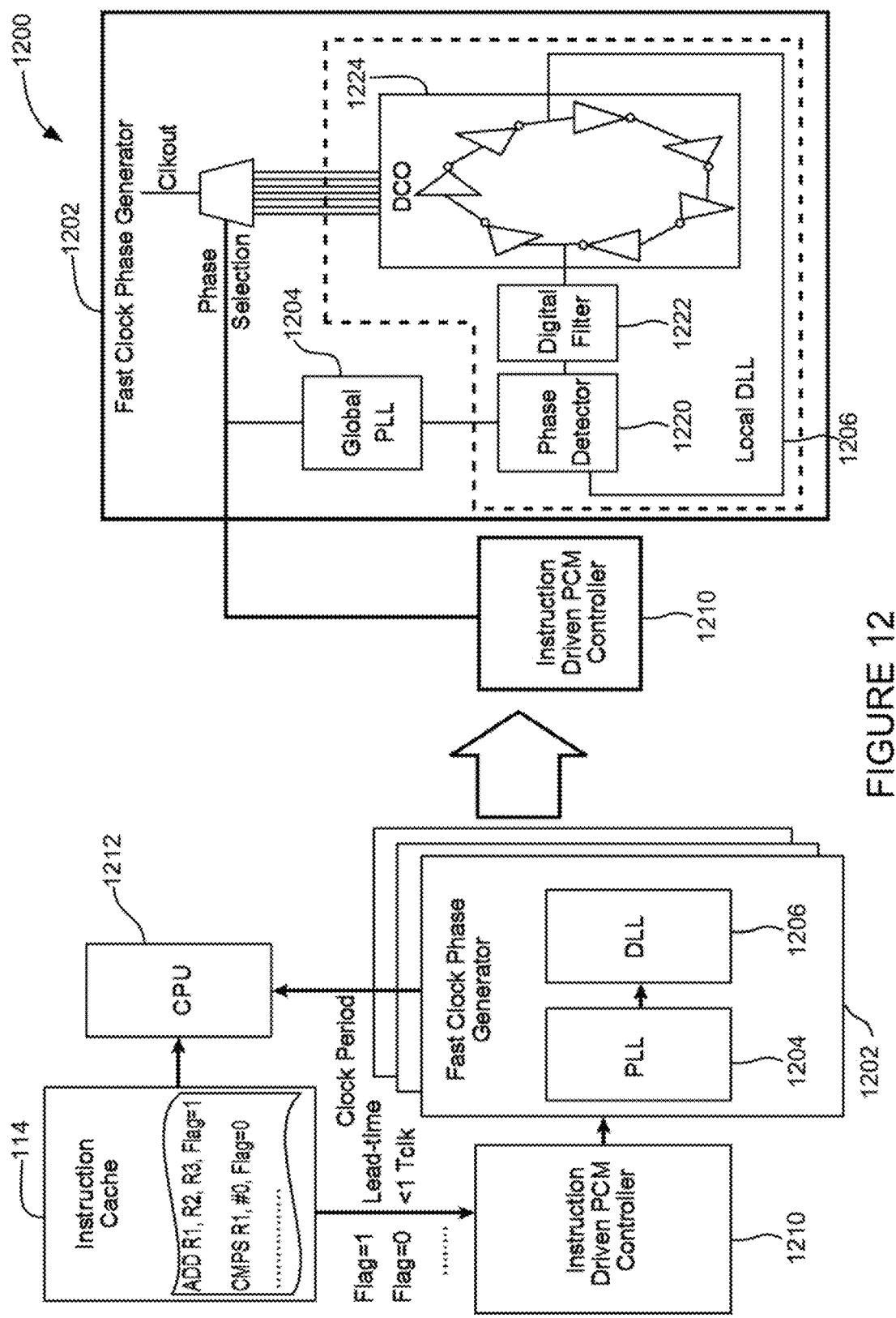
FIG. 12 is an example circuit diagram of an all-digital clock generation for greybox computing.

FIG. 12 is an example circuit diagram 1200 of an all-digital clock generation for greybox computing. Dedicated clock management circuitry has been previously developed in commercial microprocessors. Examples include Intel's Foxton processor which features fast clock period management circuits to respond to power supply noises. The clock period can be adaptively adjusted within one clock cycle time to compensate the timing loss from fast power supply drop. This capability can be incorporated with the speculation based software control to achieve power saving in high performance CPUs.

In FIG. 12, the greybox computing can include adaptive clock generator circuitry 1202 receiving input from an instruction driven power clock management (PCM) controller 1210. The PCM 1210 can receive instructions for the instruction cache 110. The clock generator circuitry 1202 can include a phase locked-loop (PLL) circuit 1204 and all-digital local delay locked-loop (DLL) circuit 1206 to generate multi-phase clocks with a selection signal determined from the instruction set. The selection of DLL phase can be performed within a clock cycle, enabling a dynamic period adjustment at the speed of clock frequency. The processor 1212 can receive a clock period from the generator 1202 and instructions from the cache 114. Although the power overhead of DLL 1206 may be a concern at low voltage, it is negligible at high voltage which can make the scheme more suitable for high voltage operation. The DLL 1206 can include a phase detector 1220, digital filter 1222 and digital controlled oscillators (DCO) 1224. The DLL 1206 may introduce additional jitter due to the mismatch at various delay stages inside the DCO 1224 and is carefully designed and budgeted for high performance operation. The energy saving from the clock management scheme is similar to that from the power management scheme as both of them allow supply voltage to overscale beyond the conventional design target.

Compiler Assisted Online Calibration Scheme for Variation Resiliency

Figure 13:
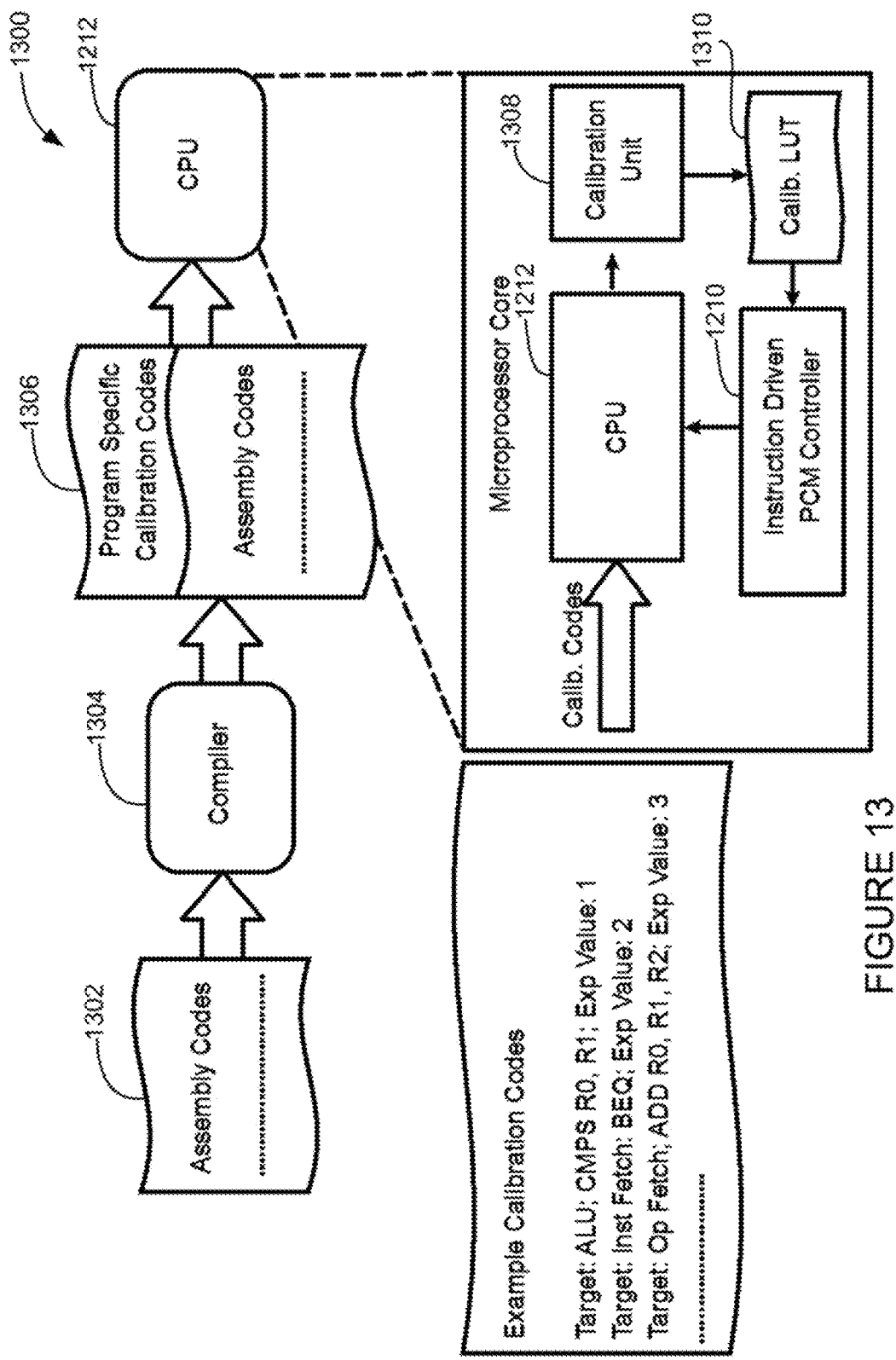
FIG. 13 is a flow diagram of an example calibration scheme for variation tolerance.

FIG. 13 is a flow diagram 1300 of an example calibration scheme for variation tolerance. The description above provide systematic approaches for achieving ultra-energy saving from voltage overscaling without violating the basic timing constraints on the design. Limitations due to process and runtime variation may occur. For example, an expected critical instruction such as "SUBS" or "CMP" may no longer be as critical due to random variation on the chip; or the level of voltage scaling for critical instruction may need to be increased if substantially slow process is observed. The conventional design approaches budget the variation into the margins at the expense of loss of energy efficiency. To overcome this, a compiler assisted online calibration scheme can be used to create variation resiliency.

Calibration has been used for existing analog and mixed-signal circuit design to reduce the impact of process variation on small amount of critical devices. However, the use of calibration for digital circuits is not common because of the large amount of critical timing paths and the difficulty of providing a clear functional target. Leveraging the instruction association created, the visibility of critical paths from system level can be dramatically increased. Therefore, it becomes possible to view the circuit-level performance from the Instruction Set Architecture (ISA). A limited subset of the ISA can be used to calibrate the critical path performance before execution of the users' program using on-line test.

In FIG. 13, an example calibration sequence is shown. Program specific calibration codes (1302) can be assembled by compiler (1304) into each program at the beginning of program execution (1306). The calibration codes perform testing on the CPU 1212 performance with relevant instructions. The test is carried on with a calibration unit (1308) by comparing the expected results with CPU output to determine the allowable voltage or frequency values for particular instructions and can be guided by system software. The calibration result is stored in a look-up-table (LUT) (1310) for power/clock management circuitry to use during instruction fetch (1210). Because calibration processes add into energy and latency overhead to the program, the calibration codes can be carefully developed and minimally selected. To ensure functionality, the power and clock management is configured to work under worst-case setting similar to conventional design. The calibration is used to remove pessimism by performing selected critical instructions. To reduce the number of instructions to be calibrated, the compiler (1304) can intelligently select only the most frequently used instructions for calibration of each program while ignoring the remaining instructions, e.g., in a pessimistic configuration. Optimal code selection can be used that provides the best tradeoff between the calibration energy overhead and program energy saving. Note that the calibration codes may need to be run in the background periodically to account for temperature change and other power supply conditions. Overall, the calibration process allows us to mitigate the impact from process variation as well as improve the robustness and energy efficiency of the greybox computing scheme.

An instruction governed real-time, ultra-low power management scheme is described. Based on the extensive instruction timing analysis, an association between instruction pattern and hardware performance was established, long delay instruction prediction accuracy achieves higher than 40%. Fully integrated circuit level simulation with optimized switching regulator and dedicated instruction controller was performed in a 45 nm CMOS technology to verify the described scheme in ultra-low power operation at near-threshold regime. Implementation on benchmark programs with an ARM microprocessor design showed an extra energy saving of about 14% using the described dynamic power scheme. A compiler assisted program optimization was also introduced to further improve the efficiency of the described scheme by 2~3%.

By collaborating on-chip regulator or clock generation circuitry with the fetched instructions in the pipeline stages, the systems and methods can allow chip voltage to scale automatically based on the need from the instructions under operation. Techniques that enable the instruction governed operation can include (1) an analysis methodology to create a sophisticated mapping of hardware critical path and software instruction; (2) an integrated voltage regulator or clock generator operation scheme controlled by instruction types; (3) a compiler optimization methodology to improve the energy efficiency in the proposed scheme. Applications include low power and high performance microprocessor designs, low power digital signal processing (DSP) circuit designs, and embedded integrated circuits (ICs), e.g., used in wearable electronics and medical devices. Advantages include conventional single instruction level voltage and frequency scaling leading to significant energy saving versus dynamic voltage and frequency scaling.

Example Hardware Design

As there is only small number of instructions execute the longest critical paths in the pipeline, it may not be efficient to only improve the longest critical path delay as the conventional design optimization. On the other hand, benefits can be obtained if the hardware design is optimized based on the usage of instructions from a software program. For instance, improving more frequently used instructions can lead to higher frequency speedup even if the instruction is not on the critical path. The area cost of optimizing such less critical instruction can be less than the cost of instructions on critical path. First, analysis on software programs can be performed, with the frequency of each instruction's usage extracted and ranked. Second, a sophisticated software instruction and hardware gate level netlist mapping can be conducted, with a mathematical model of the weighting function developed to provide guideline on the benefits and costs of optimization for each instruction. Finally, the ranked instructions can be optimized through backend optimization flow to obtain maximize speedup with minimum hardware costs.

Instruction Usage Mapping with Hardware

Figure 14A:
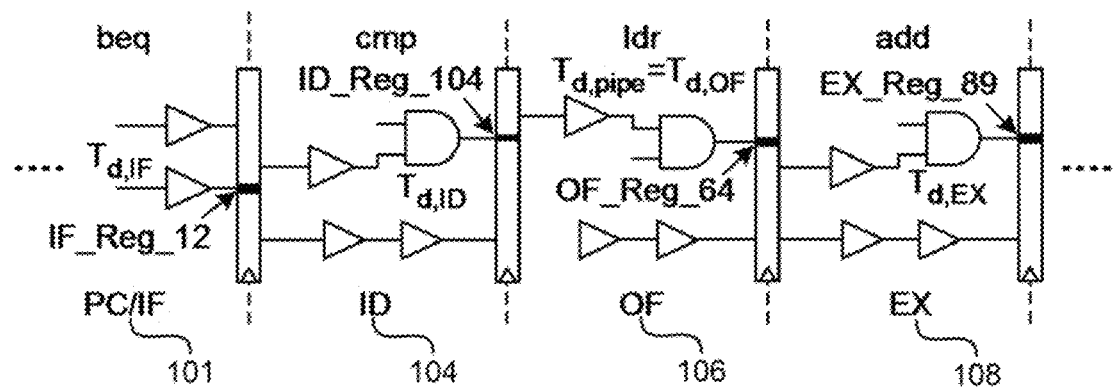
FIG. 14A is a circuit diagram of an example simulation of the critical endpoint.
Figure 14B:
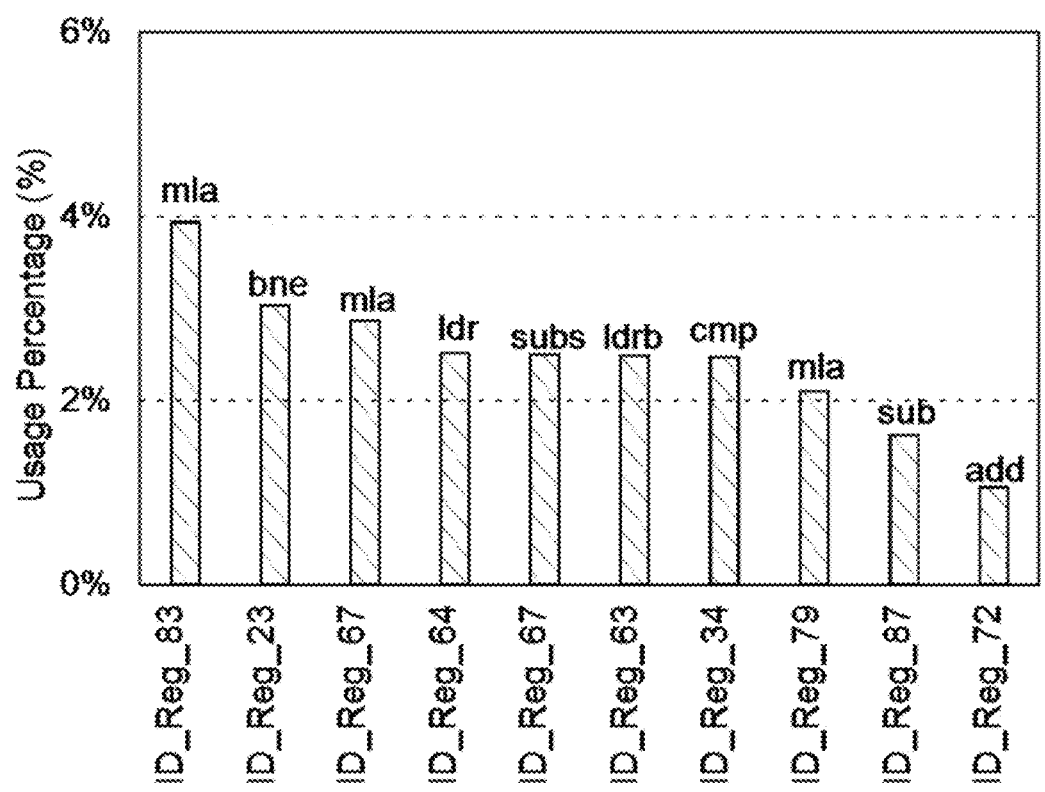
FIG. 14B is a graph of example usage percentage CEP mapped with instruction in one benchmark.

As shown in the example in FIG. 14A, cross-layer simulations captures the instructions with the dynamic execution time and the critical path endpoint registers for each pipeline stage in one clock cycle. The pipeline stage with longest execution time determines the pipeline clock period $T_{d,pipe}$. At the same time, its corresponding path endpoint is denoted as critical endpoint (CEP), e.g. the OF_Reg_64(1dr) in FIG. 14A. The number of times of each CEP register observed in simulations over the total instruction numbers is determined as CEP usage percentage $p_{CEP}$, which represents the individual CEP usage frequency during the program operations. The mapping of registers to a particular instruction allows to associate software instruction usage with hardware gate level netlist. FIG. 14B shows an example top ten high usage percentage CEPs mapped with instruction type in one program. In practice, all CEP usage percentage can be calculated and ranked.

Figure 15:
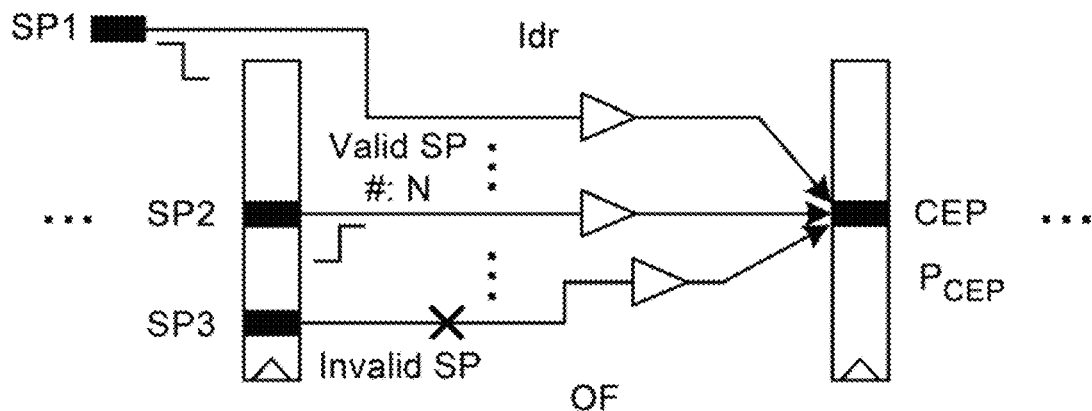
FIG. 15 is a circuit/flow diagram of example instruction path groups identified by SP and CEP.

To create finer mapping between instructions and gate level logic paths, corresponding instruction start points (SP) in gate level netlist are also obtained. In the flow, all the possible SP register candidates can be identified based on the RTL design. Their register value transitions are stored during the simulations. As the example in FIG. 15, register SP1 and SP2 value transitions between 0 and 1, which could possible trigger the logic paths ended at CEP. Register SP3 maintains a constant register value and is not a valid path start point. As a result, SP1, SP2 and CEP construct a path group which maps into instruction "ldr". A path group can be formulated as shown in (10), where the instruction is mapped with N numbers of SP, CEP, dynamic delay bound, and the frequent usage of the instruction. All instructions are mapped in this format into gate level netlist. As shown in FIG. 7, all the gate level logics on the instruction paths are shown in the backend layout. Several high usage percentage instruction path examples are also highlighted.

$$\text{Path}_{instr(stage)} = \{SP_1, SP_2, \ldots, SP_N, CEP, T_{bound}, p_{CEP}\} \quad (10)$$

Program-Driven Optimization Method

In order to obtain more clock speedup benefit, a program-driven hardware optimization flow is developed. In general, specific optimization constraints are added to the instruction paths to constrain the path execution time, as (11).

$$T_{path} = T_{bound} - t_{opt} \quad (11)$$

in which $t_{opt}$ represents optimization strength. Larger $t_{opt}$ brings more clock speedup benefit while generates more area penalty. The optimization may become ineffective if $t_{opt}$ is too large to cause timing violation. In our experiment, $t_{opt}$ ranges from 0.1 to 0.3 ns.

A mathematical model is developed to quantify the area cost as (12) in which m is the total number of path groups under optimization, $t_{opt}$ is the target improvement of speed, and N is the path numbers in each path group. α is an empirical constant factor, which varies within 1.2e-3-2e-3 in experiment. This cost equation relatively represents the difficulty of improvement, e.g. the number of logic path under optimization and the optimization timing target.

$$\text{Cost} = \alpha \Sigma_{i=1}^{m} t_{opt,i} \times N_i \quad (12)$$

All the instruction path groups are ranked by the path weight function considering their usage percentage $p_{CEP}$, area cost and associated $T_{bound}$ for the instruction, as shown in (13). Here, larger $T_{bound}$ is given higher optimization priority because it provides more speedup improvement space.

$$w_i = \frac{T_{bound,i} \times p_{CEP,i}}{Cost_i} = \frac{T_{bound,i} p_{CEP,i}}{\alpha t_{opt,i} N_i} \quad (13)$$

With the total optimization path groups number of m, the optimization weighted sum is expressed as (14). If all the instruction path groups are optimized, then $\text{weight}_{opt}$ is 100%. It is interesting to observe that only small portion (<20%) of path group contribute to the weighted sum of 70%. This means we can selectively optimize small portion of instruction paths to obtain majority of speed up, which aligns with our earlier observation.

$$\text{weight}_{opt} = \frac{\sum_{i}^{m} w_i}{\sum w_i} \times 100\% \quad (14)$$

After the instruction path weights calculated, instruction paths are optimized by utilizing "set_max_delay" command to constrain the max execution delay of logic path to $T_{bound} - t_{opt}$. The optimization efficiency at either front-end synthesis stage or back-end place and route stage can be compared. Examples can show that optimizing design at back-end can more effective as it considers the practical place and route effects, while optimizing design at both front-end and back-end almost incurs twice area cost.

Optimization Performance and Cost

To verify the program-driven optimization performance and the cost, three cases with different optimization weighted sum are conducted. Example results show that more than half of the speedup benefits (4.98%) have been obtained in Case A (weighted sum of 70%) with only 1.8% area overhead. In Case B (weighted sum of 85%), speedup of 7.82% is achieved with area cost only 3.4%. If all the path groups are optimized, as in Case C, 9.64% speedup improvement is achieved with the area cost of 7.2%. This observation highlights a strength of the optimization method, e.g., majority of benefits are obtained with very little area overhead, which also demonstrates the effectiveness of our weighting functions. The program-driven optimization is also compared with a "blind" optimization without the knowledge of instruction usage. A comparison can show the proposed optimization achieves almost twice of speedup benefits compared with the "blind" optimization where the weight of instruction path is not considered. With the proposed optimization flow, instructions with dynamic timing ranges 1~1.2 ns are constrained down to less than 1 ns. When more path groups are optimized, more instructions are optimized to be shorter delay, as in Case C compared with Case B. Comparing the baseline design and Case C, a speedup of 9.64% is achieved with the proposed program-driven optimization method.

Example System Scheme Implementation

Overall System Design

Figure 16:
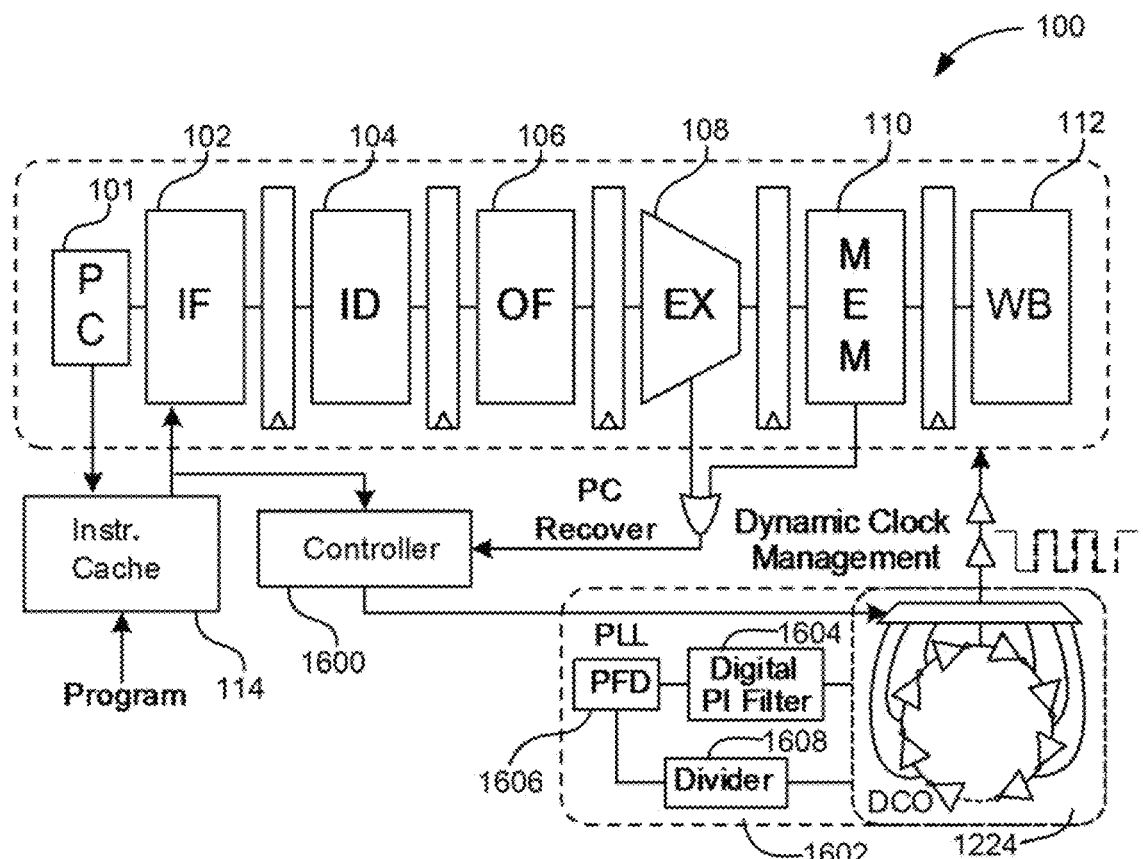
FIG. 16 is a block diagram of a proposed system scheme.

The diagram of a dynamic clock system is shown in FIG. 16, which includes ARM pipeline 100, controllers 1600, PLL 1602, etc. The PLL 1602 can include digital control oscillator DCO 1224 connected with a digital proportional-integral (PI) filter 1604, a phase/frequency detector (PFD) 1606 and a divider 1608. The dynamic clock period management can be determined by 3-bit control values which can be allocated based on $T_{bound}$, e.g., longest execution delay required by all instructions at different pipeline stages at one particular cycle, and encoded into each individual instruction code, which is similar to the previous study where benign binary modification techniques have been used to encode information directly into the instruction stream. The instruction is sent to both IF stage 102 and a control unit, controller 1600. The dynamic clock period control is decoded by the controller 1600, which is sent to the PLL 1602 glitch-less phase selection then. Considering the delay time of controller unit, the dynamic clock period control value is encoded one cycle early than its actual execution cycle. Comparing with the conventional PLL clock, the hardware overhead of the proposed scheme is the phase selection mux and control unit, which is negligible compared with overall processor area.

Besides the regular PC fetch, the pipeline could experience flush scenarios by instructions like branch or ldr pc, which trigger the PC recover signal. As the pipeline is blank after flush, the first few instructions entering the pipeline always completed within short time in the experiment. Thus, the pipeline PC recover signal is added to notice the controller to provide short clock period after each pipeline flush. Examples can show the PC recover function introduces additional 2% clock speedup benefit.

ADPLL Design and Phase Noise Margin

Figure 17:
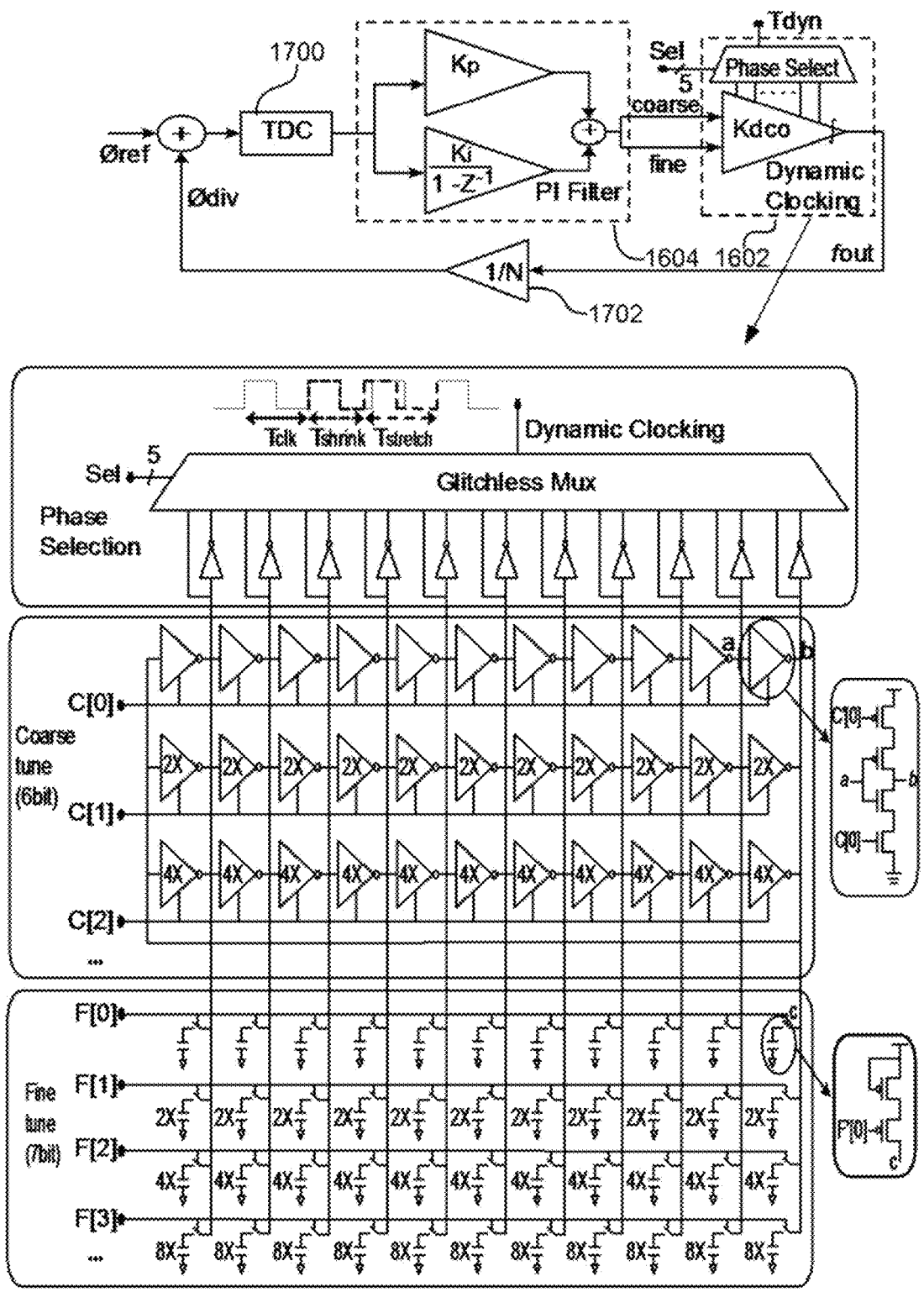
FIG. 17 is block diagram of an example ADPLL design and the dynamic clocking generation.

In order to generate cycle-by-cycle dynamic clocking, an all-digital phase locked loop (ADPLL) with clock phase selector is designed in 65 nm technology with full transistor implementation. The ADPLL loop can include time-to-digital converter (TDC) 1700, digital proportional-integral (PI) filter 1604, digital controlled oscillator (DCO) 1224 of dynamic clocking 1602, and frequency divider 1702, in the FIG. 17. The DCO frequency is proportional to the drain current of the ring array and inversely proportional to the loading capacitance. There are 6 bit coarse tuning and 7 bit fine tuning to control active rings and loading capacitance, which achieve the coarse and fine resolution 30 MHz and 0.3 MHz. The ADPLL output frequency can covers 30 MHz to 2 GHz.

For the DCO design, eleven stages are designed in each ring element, which provide total twenty-two phases with the constant delay $t_{delay}=T_{out}/22$. To maintain same delay between adjacent phase, identical fine capacitance loads area distributed at each phase. All these twenty-two phases are connected to a glitch-less multiplexer, which is selected by 5 bit signal from the controller. Whenever the pipeline requires shorter/longer clock period, the mux selection is accordingly changed by n and generates $T_{shrink}=T_{out}-n \times t_{delay}$ or $T_{stretch}=T_{out}+n \times t_{delay}$.

It can be observed that phase noise is −108.4 dBc/Hz at 1 MHz offset. The DCO quantization noise is expressed by (15) and dominate the phase noise around the loop bandwidth due to DCO fine frequency tuning resolution, e.g., 0.3 MHz, while it can be further suppressed by adding sigma delta module between DCO and PI filter.

$$Q(\omega) = T_{ref} \left| \frac{2\pi K_{DCO}}{\omega} \right|^2 \left| 1 - e^{j\omega T_{ref}} \right|^2 \frac{1}{12} \qquad (15)$$

The simulated phase noise is integrated resulting in cycle-to-cycle jitter $t_{jitter}=7.8$ ps as determined by (16).

$$\sigma_{jitter}^2 = \int |X(\omega)|^2 4 \sin^2(\omega/2) d\omega \qquad (16)$$

in which $X(\omega)$ represents the power spectrum of the phase noise. The overall jitter performance leads to a conservative 6-sigma jitter of less than 50 ps and will not introduce significant constraint on system timing budget. During the system level dynamic clock period adjustment, PLL jitter and other variations, e.g., PVT, can be considered into the safety margin, as (17).

$$T_{dyn} \geq (T_{clk} \pm n \times t_{delay}) + t_{jitter} + t_{PVT} \qquad (17)$$

The systems and methods described above may be implemented in many ways in many different combinations of hardware, software firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, it can be apparent that many more embodiments and implementations are possible. Accordingly, the embodiments are not to be restricted.

We claim:

1. A system, comprising:
    a processor connected with a programmable regulator, a compiler, and a control unit; and
    where the compiler determines cycle-by-cycle, a performance association outcome for each pipeline stage of the processor to generate a 2-bit regulator control values to be encoded into individual instructions to be executed in the processor at subsequent clock cycles; and where the processor decodes the 2-bit regulator control values and sends the decoded 2-bit regulator control to a voltage controller comprised in the control unit which controls the programmable regulator to raise supply voltage.

2. The system of claim 1, where the supply voltage adjusts either 25 mV or 50 mV based on the decoded 2-bit regulator control.

3. The system of claim 1, where the 2-bit regulator control is sent after the instruction arrives at an ID stage in the processor.

4. The system of claim 1, where the 2-bit regulator control encoded in the instruction presents a forward-looking voltage setting for instruction two cycles after and only trigger action of regulator one clock cycle after it is decoded.

5. The system of claim 1, where a voltage level of voltage level 0.55V is applied for the instruction longer than 16 ns, a voltage level of level 0.525V is applied for the instruction which takes 14~16 ns, and a voltage level of voltage 0.5V is applied for the instruction which takes less than 14 ns.

6. The system of claim 1, where the processor comprises an advanced reduced instruction set computer (RISC) machines (ARM) core processor.

7. The system of claim 1, further comprising an adaptive clock generator circuitry.

8. The system of claim 7, where the adaptive clock generator circuitry receives input from an instruction driven PCM controller.

9. The system of claim 8, where the adaptive clock generator comprises a phase locked-loop circuit and a delay locked-loop circuit to generate a multi-phase clock with a selection signal determined from the instruction.

10. The system of claim 9, where the delayed locked-loop comprises a phase detector, a digital filter and a digital controlled oscillator.

11. The system of claim 1, where the compiler is configured to generate calibration codes and send the calibration codes to the processor to control variation tolerance of the processor.

12. The system of claim 11, where the compiler selects only most frequently used instructions for calibration based on a defined configuration while ignoring remaining instructions.

13. The system of claim 11, further comprising a calibration unit connected with an output of the processor, the calibration unit to determine at least one of an allowable voltage and frequency value for the instructions.

14. The system of claim 13, further including a lookup table, where the allowable voltage and frequency value are stored in the lookup table for power/clock management circuitry to use during instruction fetch.

15. The system of claim 1, where the processor includes at least one of a high performance microprocessor, a low power digital signal processing circuit, and an embedded integrated circuit.

16. The system of claim 1, where dynamic clock period management is determined by 3-bit control values.

17. The system of claim 16, where the 3-bit control values are encoded into the individual instructions.

18. The system of claim 17, where the individual instructions are sent to both an instruction fetch stage and the control unit.

19. The system of claim 18, where the dynamic clock period is decoded by the control unit, which is sent to a phase locked-loop glitch-less phase selection circuit.

* * * * *